(12) United States Patent
Young

(10) Patent No.: US 12,041,951 B2
(45) Date of Patent: Jul. 23, 2024

(54) ISOLATED TASTE-MODIFIER AND METHOD OF MAKING SAME

(71) Applicant: TASTES NATURAL, LLC, Danbury, CT (US)

(72) Inventor: Joshua V. Young, Liberty Township, OH (US)

(73) Assignee: TASTES NATURAL, LLC, Danbury, CT (US)

( * ) Notice: Subject to any disclaimer, the term of this patent is extended or adjusted under 35 U.S.C. 154(b) by 608 days.

(21) Appl. No.: 17/186,217

(22) Filed: Feb. 26, 2021

(65) Prior Publication Data

US 2021/0177025 A1 Jun. 17, 2021

Related U.S. Application Data

(63) Continuation of application No. PCT/US2019/049634, filed on Sep. 5, 2019.

(60) Provisional application No. 62/735,305, filed on Sep. 24, 2018.

(51) Int. Cl.
| | |
|---|---|
| *A23L 27/00* | (2016.01) |
| *A23L 2/56* | (2006.01) |
| *A23L 27/10* | (2016.01) |
| *A23L 33/105* | (2016.01) |
| *A23L 33/115* | (2016.01) |
| *A23L 33/15* | (2016.01) |

(52) U.S. Cl.
CPC ............... *A23L 27/88* (2016.08); *A23L 2/56* (2013.01); *A23L 27/10* (2016.08); *A23L 33/105* (2016.08); *A23L 33/115* (2016.08); *A23L 33/15* (2016.08)

(58) Field of Classification Search
CPC .......... A23L 27/10; A23L 27/88; A23L 33/15; A23L 33/105; A23L 33/115; A23L 2/56
See application file for complete search history.

(56) References Cited

U.S. PATENT DOCUMENTS

| | | | | |
|---|---|---|---|---|
| 3,857,982 | A * | 12/1974 | Sevenants | A23L 27/11 426/655 |
| 4,741,914 | A * | 5/1988 | Kimizuka | A23L 27/105 426/651 |
| 8,173,837 | B1 * | 5/2012 | Fish | C07C 273/189 562/514 |
| 10,945,979 | B1 * | 3/2021 | Schroeder | A23K 20/158 |
| 2008/0032011 | A1 | 2/2008 | Liniger et al. | |
| 2009/0123612 | A1 * | 5/2009 | Takatsu | A23L 33/105 426/106 |
| 2010/0004335 | A1 * | 1/2010 | Kagami | A23K 50/50 514/563 |
| 2010/0136205 | A1 * | 6/2010 | Konishi | A23L 2/52 426/597 |
| 2010/0184167 | A1 * | 7/2010 | Maruyama | C12Y 301/0102 435/171 |
| 2018/0092375 | A1 * | 4/2018 | Young | A23L 23/00 |
| 2020/0030273 | A1 * | 1/2020 | Harris | C12Y 304/22033 |
| 2021/0177025 | A1 * | 6/2021 | Young | A23L 33/105 |

FOREIGN PATENT DOCUMENTS

| | | | |
|---|---|---|---|
| EP | 2292102 | A1 | 3/2011 |
| EP | 2292103 | | 3/2011 |
| EP | 2332425 | A1 | 6/2011 |
| EP | 2789246 | A1 | 10/2014 |
| EP | 3120713 | A1 | 1/2017 |
| EP | 3855937 | | 8/2021 |
| GB | 1432329 | A | 4/1976 |
| JP | S5195164 | A | 8/1976 |
| JP | 2003079335 | A | 2/2003 |
| JP | 2004292778 | A | 10/2004 |
| JP | 2007097594 | A | 4/2007 |
| JP | 2010041935 | A | 2/2010 |
| JP | 2018027923 | * | 2/2018 |
| WO | 9813075 | | 4/1998 |
| WO | 2010121203 | A1 | 10/2010 |
| WO | 2019040989 | | 3/2019 |
| WO | 2020068386 | | 4/2020 |

OTHER PUBLICATIONS

Translation for JP2010041935 published Feb. 2010.*
Translation for JP2018027923 published Feb. 2018.*
Translation for JP2004292778 published Oct. 2004.*
Translation for JP2007097594 published Apr. 2007.*
Chinese Office Action issued in App. No. CN201980060684, dated Apr. 21, 2023, 10 pages.
Japanese Office Action (including English translation) issued in App. No. JP2021-512933, dated Mar. 7, 2023, 10 pages.
Gaudette, N. et al, Modifying Bitterness in Functional Food Systems, Critical Reviews in Food Science and Nutrition, 2013, 53:5, pp. 464-481.
International Search Report and Written Opinion in International Patent Application No. PCT/US2019/049634 mailed Dec. 12, 2019.
Canadian Office Action issued in App. No. CA3111573, dated Feb. 9, 2024, 3 pages.
International Preliminary Report on Patentability issued in App. No. PCT/US2019/049634, dated Mar. 23, 2021, 9 pages.

* cited by examiner

*Primary Examiner* — Anthony J Weier
(74) *Attorney, Agent, or Firm* — Dilworth IP, LLC

(57) ABSTRACT

A process for isolating a taste-modifier component useful for food, beverage, nutraceutical, or pharmaceutical applications is shown. A pulverized fruit- or vegetable-based feedstock is combined with a natural, edible solvent to produce a heterogeneous mixture. A liquid phase isolated from this mixture is contacted with an acidic ion-exchange resin to sequester a basic taste-modifier component. The resin is then treated with a dilute aqueous solution of an alkali metal hydroxide to elute the taste-modifier component. The taste-modifier component, which is further activated by mild heating, is combined with vitamins, flavors, and other food additives and is incorporated into aqueous, oil-based, or powder-based taste-modifier compositions that have improved efficacy compared with previously known taste-modifiers.

19 Claims, No Drawings

ISOLATED TASTE-MODIFIER AND METHOD OF MAKING SAME

FIELD OF THE INVENTION

The invention relates to taste-modifiers and a process for isolating them. The taste-modifiers are useful for blocking negative flavors in food, beverage, nutraceutical, and pharmaceutical applications.

BACKGROUND OF THE INVENTION

Humans have a natural aversion to the negative flavors of certain foods, even ones that benefit our health, such as raw vegetables. Negative flavors apply to various unpleasant tastes and includes sharp, acidic, tart, sour, biting, unsweetened, pungent, tangy, or zesty tastes. Taste buds on our tongue and in our mouth allow us to distinguish what is sweet, sour, salty, bitter, or savory.

Traditional approaches to blocking the negative flavors of certain foods and beverages rely on a masking strategy, such as adding sweeteners, preservatives, or other synthetic additives. Pharmaceuticals are no exception; for good reasons, "a bitter pill to swallow" has long been a cliché.

Less frequently, taste-modifiers from natural sources have been identified. U.S. Publ. No. 2018/0092375, for example, describes edible dip compositions that contain a cucumber extract-based taste-modifier in combination with a spice and two lactose-based compositions. The taste-modifier is obtained by blending cucumbers, ethanol, and water under high-shear conditions, filtering the mixture, and heating the filtrate briefly at 155° F. Taste-modifiers produced using this method are effective, but there is room for improvement, particularly in generating taste-modifiers with greater efficacy.

SUMMARY OF THE INVENTION

In one aspect, the invention relates to a process for isolating a taste-modifier component useful for food, beverage, nutraceutical, or pharmaceutical applications. The process comprises four steps. First, a pulverized fruit- or vegetable-based feedstock is combined with a natural, edible solvent to produce a heterogeneous mixture. A liquid phase is then isolated from the heterogeneous mixture. Next, the isolated liquid phase is contacted with an acidic ion-exchange resin to sequester a basic taste-modifier component from the liquid phase. The ion-exchange resin is then treated with a dilute solution of an alkali metal hydroxide to elute the taste-modifier component. The taste-modifier component is further utilized to produce aqueous, oil-based, and powder-based taste-modifier compositions.

In some aspects, the taste-modifier component is, in any desired order, diluted with water, heated at a temperature within the range of 50° C. to 120° C., and combined with a vitamin, a flavor, or another food additive to produce an aqueous taste-modifier composition.

In other aspects, the taste-modifier component is concentrated to remove some or all of the water, and the resulting concentrate is combined with an edible oil and a vitamin, a flavor, or another food additive to produce an oil-based taste-modifier composition.

In other aspects, taste-modifier component is concentrated to remove some or all of the water, the resulting concentrate is combined with a food- or beverage-grade emulsifier to form an emulsion, and the emulsion is spray dried to produce a powder-based taste-modifier composition. A vitamin, flavor, or other food additive is combined with either the emulsion prior to spray drying or the powder-based taste-modifier composition.

In some aspects, the concentration to remove water is performed under vacuum at a temperature within the range of 50° C. to 90° C.

In a preferred aspect, the fruit- or vegetable-based feedstock is from the Cucurbitaceae family of plants, which includes cucumber, squash, zucchini, pumpkin, honeydew, cantaloupe, watermelon, and other similar plants.

In another preferred aspect, the fruit- or vegetable-based feedstock is from the Solanaceae family of plants, which includes tomato, potatoes, eggplant, bell peppers, chili peppers, tobacco, and other similar plants.

In another preferred aspect, the fruit- or vegetable-based feedstock is from the Rutaceae family of plants, which includes oranges, tangerines, mandarins, clementines, lemons, limes, grapefruit, citrons, kumquats, orangeberry, clymenia, white sapote, bael, sudachi, and other similar plants.

In another preferred aspect, the heterogeneous mixture or the liquid phase isolated from the heterogeneous mixture is chilled at a temperature within the range of 0° C. to 10° C. for 4 to 96 hours.

In other aspects, the invention includes taste-modifier components and aqueous, oil-based, or powder-based taste-modifier compositions made using these processes.

The invention also includes foods, beverages, nutraceuticals, and pharmaceuticals that include the aqueous, oil-based, or powder-based taste-modifier compositions.

The efficacy of taste-modifiers can be improved by practicing these process steps, which involve isolating by ion-exchange a more concentrated form of taste-modifier than was previously available. Surprisingly, the effectiveness of the taste-modifier component is further enhanced by heating at least briefly to 50° C. to 120° C., particularly from 50° C. to 90° C.

DETAILED DESCRIPTION OF THE INVENTION

A. Isolation of a Taste-Modifier Component

In one aspect, the invention relates to a process for isolating a taste-modifier component useful for food, beverage, nutraceutical, or pharmaceutical applications. In a first process step, a pulverized fruit- or vegetable-based feedstock is combined with a natural, edible solvent to produce a heterogeneous mixture.

1. Fruit- or Vegetable-Based Feedstock

Numerous fruit- or vegetable-based feedstocks contain useful amounts of components capable of functioning as taste-modifiers. Examples include members of the Solanaceae plant family, members of the Rutaceae plant family, members of the Cucurbitaceae plant family, herbs, spices, cabbage, peanuts, asparagus, soy, chives, and collard greens. In a preferred aspect, the feedstock is a Rutaceae, especially oranges, tangerines, mandarins, clementines, lemons, limes, grapefruit, citrons, kumquats, orangeberry, clymenia, white sapote, bael, sudachi, and the like. In another preferred aspect, the feedstock is a Cucurbitaceae, especially cucumber, pumpkin, squash, zucchini, honeydew, cantaloupe, or watermelon. In another preferred aspect, the feedstock is a Solanaceae, especially tomatoes, potatoes, eggplants, bell peppers, chili peppers, or tobacco. Many suitable fruit- or vegetable-based plants are from genus *Curcurbita* and are classified as *C. maxima, C. moschata, C. pepo*, or *C. argyrosperma*. In another preferred aspect, the feedstock is from the family Solanaceae. In yet another preferred aspect, the feedstock is from the family Rutaceae.

In preferred aspects, the skins, rinds, or peels of the fruit- or vegetable-based feedstock are used either exclusively or in combination with some proportion of the rest of the fruit or vegetable. Thus, in some aspects, the skins or peels comprise at least 30 wt. %, at least 40 wt. %, or at least 50 wt. % of the fruit- or vegetable-based feedstock.

2. Natural, Edible Solvent

The feedstocks described above are combined with a natural, edible solvent. Suitable natural, edible solvents include, for example, water, ethanol, dilute acetic acid (e.g., vinegar), glycerin, and mixtures thereof. In preferred aspects, an aqueous mixture containing a minor proportion of ethanol, acetic acid, glycerin, or a combination of these is used as the edible solvent. Aqueous ethanol mixtures containing from 10 to 70 wt. % ethanol, from 30 to 60 wt. % ethanol, or from 45 to 55 wt. % ethanol are preferred.

3. Process

The fruit- or vegetable-based feedstock (or any combination of fruit and/or vegetable feedstocks) is pulverized by any suitable means. In some aspects, the pulverization is performed before combining the feedstock with the natural, edible solvent, although in other aspects it may be desirable to combine the feedstock with some or all of the solvent before pulverizing the mixture. Pulverizing can be accomplished by crushing, chopping, grinding, high-shear mixing, blending, or any combination of these or similar techniques used to reduce particle size. The resulting product from this initial step is a heterogeneous mixture of the pulverized feedstock and the natural, edible solvent.

In a second step, a liquid phase is isolated from the heterogeneous mixture. This can be accomplished by any suitable technique, including decantation, filtration, general centrifugation, liquid-liquid centrifugation, or a combination of these methods. The solids will normally be rinsed with water or an aqueous mixture containing more natural, edible solvent prior to disposal of the washed solids. The liquid phase, which in preferred aspects will include the rinsings, is generally suitable for use without further processing in the next step.

In some aspects, the heterogeneous mixture from the first step, the isolated liquid phase from the second step, or both, are chilled prior to further processing by ion exchange, preferably at a temperature within the range of 0° C. to 10° C. for 4 to 96 hours or from 6 to 24 hours.

The isolated liquid phase is contacted with an acidic ion-exchange resin, which sequesters one or more taste-modifying components from the liquid phase. The taste-modifying actives are believed to be primarily basic in nature, and they adhere to the resin. Suitable ion-exchange resins are strongly or weakly acidic resins, preferably strongly acidic resins, that have a polymer backbone (e.g., crosslinked polystyrene) and sulfonic acid, phosphonic acid, or carboxylic acid groups. The resins are preferably unneutralized, although in some aspects, partially neutralized resins may be suitable. Suitable resins are commercially available and include, for instance, AMBERLYST® 15, AMBERLYST® 36, AMBERJET® 1200, DOWEX® 50W series resins, AMBERLITE® IR-120 (strongly acidic resins with —$SO_3H$ groups, products of Dow Chemical); AMBERLITE® IRC-505, AMBERLITE® IRC-50, and DOWEX® MAC-3 (weakly acidic resins with —COOH groups, Dow Chemical); and DIAION™ resins (weakly acidic resin with an acrylic acid or methacrylic acid polymer backbone and —COOH groups, products of Mitsubishi Chemical); and the like.

The isolated liquid can be contacted with the acidic ion-exchange resin in any convenient manner. In some aspects, it may be desirable to pass the isolated liquid through a column containing the resin. In other aspects, a flat bed of resin that is stationary, oscillating, or rotating may be more practical. In general, the residence time of the liquid with the bed will suffice to sequester relatively basic taste-modifier components of the isolated liquid on the resin. In some aspects, it may be desirable to use a pH measurement or some other suitable means to detect when the resin has become saturated with basic components and is no longer capable of sequestering additional taste-modifier components.

The taste-modifier component is eluted or liberated from the acidic ion-exchange resin by treating the resin with a dilute aqueous solution of an alkali metal hydroxide, especially 1% to 10%, or 2% to 5%, aqueous sodium hydroxide or potassium hydroxide solution. This results in an aqueous mixture that is basic and contains the taste-modifier components in relatively concentrated form. In a preferred aspect, the aqueous taste-modifier component is neutralized with ascorbic acid (vitamin C), acetic acid, citric acid, or a combination thereof. In some cases, the resulting material may be further concentrated via ultra-filtration, thin-film evaporation, or other known techniques.

The ion-exchange resin will normally be contacted with a dilute aqueous solution of a mineral acid such as hydrochloric acid to regenerate the sulfonic acid, phosphonic acid, or carboxylic acid groups. After such a treatment, the resin can be reused for sequestering additional taste-modifier components as described previously.

In some aspects, the taste-modifier component obtained from ion exchange, either before or after any subsequent dilution, is heated at a temperature within the range of 50° C. to 120° C., 50° C. to 90° C., or from 60° C. to 85° C., followed by cooling to room temperature. Usually, the taste-modifier component is warmed gradually to the desired maximum temperature and is held there for a short duration, preferably for at least 1 minute, typically 1 to 20 minutes or 2 to 10 minutes. We surprisingly found that this brief heating step amplifies the efficacy of the resulting taste-modifier concentrate. It is usually most desirable to package the product soon after it has been cooled to room temperature. "Cooling" in this context refers either to active chilling, or in preferred aspects, allowing the heated taste-modifier component to cool to room temperature.

B. Preparation of Taste-Modifier Compositions

1. Aqueous Taste-Modifier Compositions

In some aspects, the taste modifier component (with or without neutralization) is, in any desired order, diluted with water, heated at a temperature within the range of 50° C. to 120° C., from 50° C. to 90° C., or from 60° C. to 85° C., and combined with a vitamin, a flavor, or another food additive to produce an aqueous taste-modifier composition. Suitable other food additives include, for example, acidulents, antifoamers, antioxidants, colorings, flavor enhancers, foamers, herbs, humectants, preservatives, spices, thickeners, and the like. In some aspects, the aqueous taste-modifier composition contains 0.5 to 50 wt. % of the taste-modifier component. Among flavors, vanilla extract, vanilla paste, vanilla powder, or pure vanillin can be used and are preferred. Vitamin C is a preferred vitamin additive. Other flavors or vitamins can, of course, be included, the selection of which will depend upon the intended end product.

In some aspects, an oil-based taste-modifier composition is produced. The taste-modifier component is concentrated to remove some or all of the water, and the resulting concentrate is combined with an edible oil and a vitamin, a flavor, or another food additive to produce an oil-based taste-modifier composition. Suitable edible oils include, for example, corn oil, canola oil, olive oil, peanut oil, palm oil, sesame oil, grapeseed oil, cottonseed oil, coconut oil, vegetable oil, safflower oil, soybean oil, sunflower oil, and combinations thereof. In some aspects, the taste-modifier component is concentrated under vacuum at a temperature within the range of 50° C. to 90° C. or from 60° C. to 85° C.

In some aspects, the oil-based taste-modifier composition is a water-soluble emulsion. Such an emulsion is prepared by combining a concentrate from the eluted taste-modifier component with an oil and gum acacia or a starch. Addition of an emulsifier (suitable examples of which are described below) and an ester gum or other weighting agent (i.e., a substance that effectively increases the density of the oil-soluble portion of the taste-modifier composition) allows preparation of a water-soluble emulsion when the combined ingredients are subjected to high-pressure homogenization or similar high-intensity mixing techniques.

3. Powder-Based Taste-Modifier Compositions

In some aspects, a powder-based taste-modifier composition is produced. The taste-modifier component is concentrated to remove some or all of the water, the resulting concentrate is combined with a food- or beverage-grade emulsifier to form an emulsion, and the emulsion is spray dried to produce a powder-based taste-modifier composition, which is preferably water soluble. In some aspects, the taste-modifier component is concentrated under vacuum at a temperature within the range of 50° C. to 90° C. or from 60° C. to 85° C. Suitable food- or beverage-grade emulsifiers are known in the art. Examples include acacia gum, honey, modified food starch, lecithin, soy lecithin, mustard, and the like, and combinations thereof. Acacia gum is preferred. In some aspects, the emulsion or the powder-based taste-modifier composition is combined with a vitamin, a flavor, or another food additive. In some aspects, the feedstock is citrus-based, and the emulsifier is gum acacia. In some aspects, the emulsion is spray dried in two or more stages. In other aspects, the emulsion is spray dried at a temperature within the range of 80° C. to 220° C., or from 100° C. to 210° C.

The invention includes the aqueous, oil-based, or powder-based taste-modifier compositions produced using the processes described above. In some aspects, the aqueous, oil-based, or powder-based taste-modifier composition is pasteurized. This generally involves heating the taste-modifier composition before or after packaging to eliminate potential pathogens, to prolong shelf stability, or both.

Food, beverage, nutraceutical, and pharmaceutical products that include the aqueous, oil-based, or powder-based taste-modifier compositions are also included.

Many beverages, particularly ones containing caffeine, vitamins, or other functional ingredients, can be more bitter than is otherwise desirable and can benefit from inclusion of the inventive taste-modifier compositions. Alcoholic beverages (beers, wines, hard liquors) and non-alcoholic beverages (coffees, teas, energy drinks, vegetable juices) are included as well as novelties such as alcoholic ice cubes. Suitable food products include traditional foods for humans, nutritional supplements, pet foods, feeds for livestock, and the like. Exemplary foods include those that use sugar replacements such as baked goods (cookies, cakes, pies, doughnuts), candies, and the like. For nutraceutical or pharmaceutical applications, where the actives component can be very bitter, a larger proportion of taste-modifier composition may be needed. Some examples include cough syrups, herbal tinctures, gummies, medicated drops or suckers, and the like.

The amount of taste-modifier composition desirable for a particular use will depend on many factors known to those skilled in the art, including the nature of the compound or composition that imparts negative flavor, the nature and concentration of the taste-modifier component in the taste-modifier composition, the proportion of taste-modifier composition tolerable in the food, beverage, nutraceutical, or pharmaceutical product, and other considerations. Table 1, below, provides suggested usage levels for some common compounds or compositions that impart negative flavors to food, beverage, nutraceutical, or pharmaceutical products. The overall amount used will depend on the concentration of the compound or composition that imparts negative flavor.

In general, a food or beverage product will comprise 0.1 to 1000 wt. %, or 0.5 to 200 wt. %, or 2 to 100 wt. %, of the aqueous, oil-based, or powder-based taste-modifier composition, based on the amount of taste-modifier composition relative to the amount of the compound or composition present in the food or beverage product that imparts negative flavor.

In general, a nutraceutical or pharmaceutical product will comprise 0.1 to 1000 wt. %, or 0.5 to 200 wt. %, or 2 to 100 wt. %, of the aqueous, oil-based, or powder-based taste-modifier composition, based on the amount of taste-modifier composition relative to the amount of the compound or composition present in the nutraceutical or pharmaceutical product that imparts negative flavor.

To illustrate, consider a 12-oz. (355 mL) unsweetened energy drink that contains 110 mg of caffeine. From Table 1, a desired level of taste-modifier composition is about 35 wt. % (or 38 mg taste modifier/110 mg caffeine) based on the relative amounts of taste-modifier composition and caffeine.

The following examples merely illustrate the invention; the skilled person will recognize many variations that are within the spirit of the invention and scope of the claims.

Isolation of a Taste-Modifier: General Procedure

Component A

Cucurbiticeae cucumber rinds and pulp (45.4 kg) are ground fine, immersed in aqueous ethanol (50 wt. % ethanol, 3785 L), and refrigerated at 2° C. for 24 h. The heterogeneous mixture is filtered (11 μm filter paper), centrifuged, or both to isolate a liquid phase. The liquid phase is passed through a strongly acidic ion-exchange column to sequester basic components from the liquid phase. Dilute aqueous potassium hydroxide solution (5% KOH) is passed through the column to liberate the basic component. The amount of aqueous taste-modifier mixture recovered is about 1.1 kg.

Component B

Deionized water (94.9 wt. %) is combined with ascorbic acid (Vitamin C, 5.0 wt. %) and an all-natural antimicrobial agent (0.1 wt. %).

Component C

Deionized water (95.0 wt. %) is combined with botanical extracts (about 5 wt. %) and minor amounts of other flavors.

Final Blend

Components A (2.6 wt. %), B (6.0 wt. %), and C (5.0 wt. %) are combined with deionized water (86.4 wt. %) and mixed in a blending tank under medium agitation. The mixture is slowly heated to 68° C. for about 5 min., then quickly cooled to room temperature and packaged.

The resulting product performs exceptionally well as a taste-modifier, particularly when compared with taste-modifiers prepared conventionally without using ion exchange and without heating the isolated concentrate to 50° C. to 120° C.

Table 1 shows suggested usage levels for the aqueous, oil-based, or powder-based taste-modifier compositions based on experimental field testing. The skilled person will appreciate that the amount a product formulator will choose to use could vary widely depending on product characteristics and contents.

TABLE 1

Suggested Usage Levels

| Compound or Composition Imparting Negative Flavor | Taste Modifier Composition Range (wt. %) | Taste Modifier Composition (avg. wt. %) |
| --- | --- | --- |
| amino acids, peptides | 2-15 | 5.0 |
| β-hydroxybutyrate | 45-85 | 65 |
| branched-chain amino acids | 5-35 | 17 |
| cacao | 25-75 | 50 |
| caffeine | 20-100 | 35 |
| choline chloride | 200-800 | 417 |
| fish oil | 0.1-5 | 2.0 |
| green tea extract | 20-60 | 40 |
| gymnema sylvestre | 1.0-7.0 | 3.0 |
| medium-chain triglyceride oil | 0.5-4.0 | 2.0 |
| omepraxole | 5.0-15 | 9.0 |
| sildenafil citrate | 30-75 | 51 |
| stevia | 5-25 | 15 |
| vegetable protein | 0.3-8.0 | 5.0 |

Weight percents and ranges are based on the amount of taste modifier composition relative to the amount of the listed compound or composition.

The preceding examples are meant only as illustrations; the following claims define the invention.

I claim:

1. A process for isolating a taste-modifier component useful for food, beverage, nutraceutical, or pharmaceutical applications, comprising:
   (a) combining a pulverized vegetable-based feedstock with a natural, edible solvent to produce a heterogeneous mixture, the vegetable being selected from the group consisting of, cucumber, squash, zucchini, cabbage, peanuts, asparagus, soy, chives, and collard greens;
   (b) isolating a liquid phase from the mixture in step (a);
   (c) contacting the liquid phase from step (b) with an acidic ion-exchange resin to sequester a basic taste-modifier component from the liquid phase; and
   (d) treating the ion-exchange resin with a dilute solution of an alkali metal hydroxide to elute the taste-modifier component.

2. The process of claim 1 wherin the vegetable is a cucumber.

3. The process of claim 1 wherein the natural, edible solvent is selected from the group consisting of water, ethanol, acetic acid, glycerin, and mixtures thereof.

4. The process of claim 1 wherein the heterogeneous mixture from step (a) or the liquid phase from step (b) is chilled at a temperature within the range of 0° C. to 10° C. for 4 to 96 hours.

5. The process of claim 1 wherein the liquid phase from step (b) is isolated by decantation, filtration, centrifugation, or a combination thereof prior to contacting it with the ion-exchange resin in step (c), wherein the ion-exchange resin is a sulfonic acid resin.

6. The process of claim 1 wherein the taste-modifier component is, in any desired order, diluted with water, heated at a temperature within the range of 50° C. to 120° C., and combined with a vitamin, a flavor, or another food additive to produce an aqueous taste-modifier composition.

7. The process of claim 6 wherein the aqueous taste-modifier composition is pasteurized.

8. The process of claim 6 wherein the aqueous taste-modifier composition contains 0.5 to 50 wt. % of the taste-modifier component.

9. The process of claim 1 wherein the taste-modifier component is concentrated to remove some or all of the water, and the resulting concentrate is combined with an edible oil and a vitamin, a flavor, or another food additive to produce an oil-based taste-modifier composition.

10. The process of claim 1 wherein the taste-modifier component is concentrated to remove some or all of the water, the resulting concentrate is combined with a food- or beverage-grade emulsifier to form an emulsion, and the emulsion is spray dried to produce a powder-based taste-modifier composition.

11. The process of claim 10 wherein the emulsion or the powder-based taste-modifier composition is combined with a vitamin, a flavor, or another food additive.

12. The process of claim 10 wherein the emulsion is spray dried in two or more stages at a temperature within the range of 80° C. to 220° C.

13. A taste-modifier component made by the process of claim 1.

14. An aqueous taste-modifier composition made by the process of claim 6.

15. An oil-based taste-modifier composition made by the process of claim 9.

16. A powder-based taste-modifier composition made by the process of claim 10.

17. A food or beverage product, a nutraceutical product, or a pharmaceutical product comprising the aqueous taste-modifier composition of claim 14.

18. A food or beverage product, a nutraceutical product, or a pharmaceutical product comprising the oil-based taste-modifier composition of claim 15.

19. A food or beverage product, a nutraceutical product, or a pharmaceutical product comprising the powder-based taste modifier composition of claim 16.

* * * * *